(No Model.)

VAN DYKE CRUSER.
BICYCLE DRIVING GEAR.

No. 516,082. Patented Mar. 6, 1894.

Witnesses
L. C. Hills
E. H. Bond

Inventor:
Van Dyke Cruser,
By E. B. Stocking
Attorney

UNITED STATES PATENT OFFICE.

VAN DYKE CRUSER, OF FLATBUSH, NEW YORK.

BICYCLE DRIVING-GEAR.

SPECIFICATION forming part of Letters Patent No. 516,082, dated March 6, 1894.

Application filed October 28, 1893. Serial No. 489,340. (No model.)

*To all whom it may concern:*

Be it known that I, VAN DYKE CRUSER, a citizen of the United States, residing at Flatbush, in the county of Kings, State of New York, have invented certain new and useful Improvements in Bicycle Driving-Gear, of which the following is a specification, reference being had therein to the accompanying drawings.

This invention relates to certain new and useful improvements in bicycles and more especially to the driving gear thereof. It has for its objects among others to provide a simple and cheap driving gear by which greater speed can be attained without the exertion of more power than is required in bicycles of prior constructions. I employ an internal gear carried by the frame of the machine and within which are arranged two small gears, one fast on the hub of the sprocket wheel which in turn is loose upon the pedal shaft, and the other carried by one of the pedal cranks and meshing with the internal gear and with the small gear on the hub of the sprocket wheel. The internal gear is arranged at a sufficient distance from the frame to permit of the interposition of the sprocket wheel. The gears are covered by a plate or shield which moves with the pedal crank; it is readily detached for the purpose of permitting access to the gears.

Other objects and advantages of the invention will hereinafter appear and the novel features thereof will be specifically defined by the appended claims.

The invention is clearly illustrated in the accompanying drawings, which, with the letters of reference marked thereon, form a part of this specification and in which—

Figure 1:
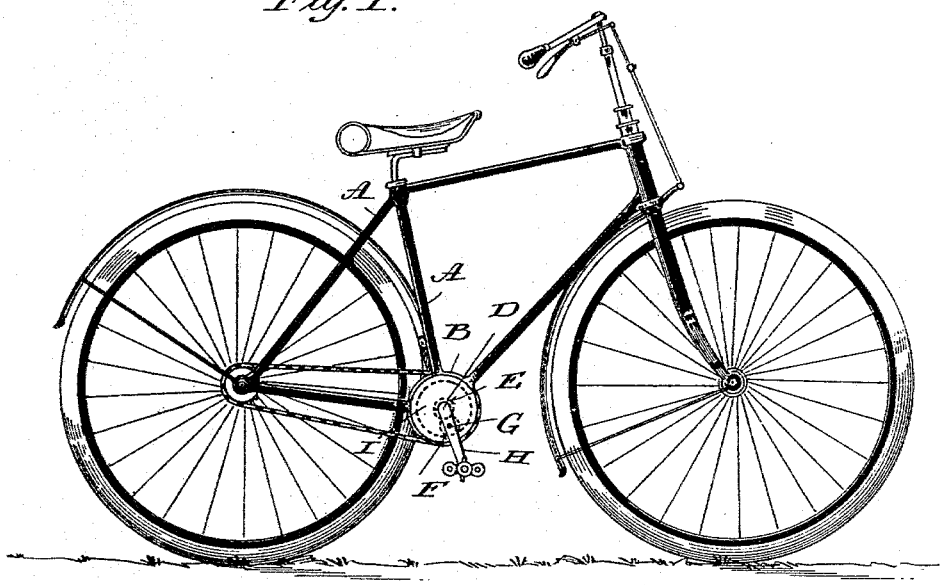
Figure 2:
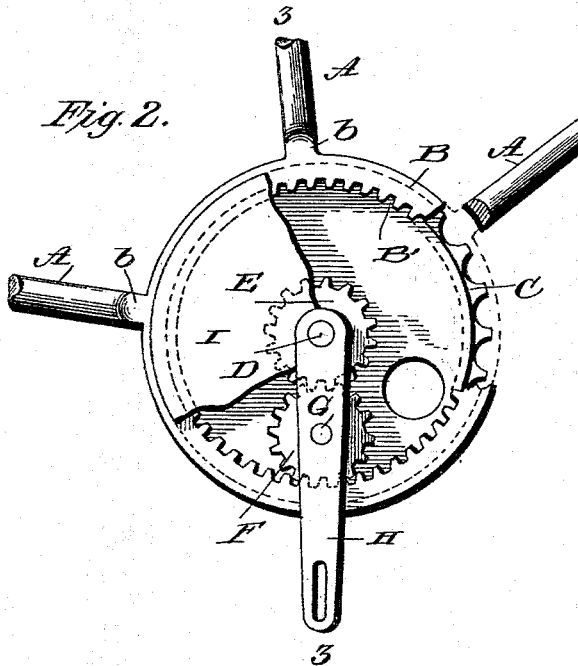
Figure 3:
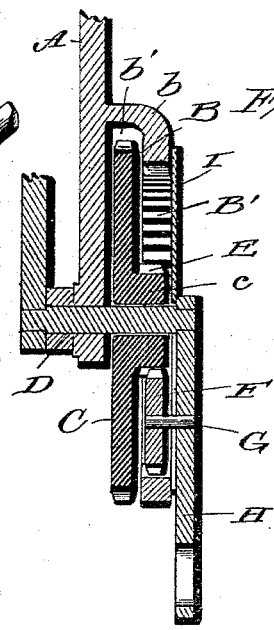

Figure 1 is a side elevation of a bicycle provided with my improvements. Fig. 2 is an enlarged side elevation of the driving mechanism with portions broken away. Fig. 3 is a vertical section on the line 3—3 of Fig. 2.

Like letters of reference indicate like parts throughout the several views.

Referring now to the details of the drawings by letter, A designates the frame of a bicycle of any style or size except in the particulars hereinafter specified.

B is a ring provided with an internal gear B' as seen in Figs. 2 and 3, and this ring may be secured to the bars of the frame of the machine in any suitable manner. In whatever way it is attached or fastened or held in position, however, it should be provided with the offsets or bends $b$ as seen best in Fig. 3, so as to leave a space $b'$ between the inner face thereof and the bars of the frame for the working of the sprocket wheel C which is loose upon the pedal shaft D as seen in Fig. 3 and having its hub $c$ formed with or having fast thereon a pinion or small gear E as shown clearly in Figs. 2 and 3, which pinion or small gear is mounted to mesh with the small gear or pinion F mounted to revolve on the pin or stub-shaft G on the pedal crank H, and which pinion F in turn meshes with the internal gear as seen best in Fig. 2.

I is a cover or shield for protecting the gears. It is arranged outside the ring B as shown and is mounted to revolve with the pedal crank; it may be secured thereto if necessary.

With the parts constructed and arranged substantially as above set forth the operation is as follows:—As the pedal is moved the pinion F is revolved and this meshing with the pinion E and with the internal gear increases the speed of the machine. The sprocket wheel and pinion E being loose upon the pedal shaft ease of movement is attained and liability of breakage is lessened.

My improvements may be readily applied to any form of machine without materially adding to the cost thereof, or change of the other parts of the machine. Ball bearings may be used when desired. The invention is applicable to other uses, for instance, to a propeller or steamboat wheel and other devices where rapidity of motion is required with slow action of the propelling power.

What is claimed as new is—

1. In a bicycle, a ring having offsets for throwing the same away from the frame to provide a space between the frame and the ring for the sprocket wheel to work in, said ring being provided with an internal gear, combined with a sprocket wheel having a hub carrying a pinion and a pinion mounted on the crank and meshing with said pinion and internal gear, substantially as specified.

2. In a bicycle, a ring having offsets for attachment to the frame and an internal gear, combined with the pedal shaft, a sprocket wheel loose on said shaft and mounted for movement in the space provided by said offsets and carrying a pinion fast on its hub, the pedal crank and a pinion mounted for revolution on a pin projecting inward from said crank and meshing with the said internal gear and pinion, substantially as specified.

3. In a bicycle, the combination with the frame, of a ring thereon having an internal gear, the pedal shaft and crank, the sprocket wheel loose on the pedal shaft between said ring and the frame and having a pinion fast on its hub, a pinion on the pedal crank meshing with said pinion and gear, and a cover for the gear and pinions rotatable with the pedal crank, substantially as specified.

In testimony whereof I affix my signature in presence of two witnesses.

VAN DYKE CRUSER.

Witnesses:
GIDEON MOWLEM,
HENRY PATON, Jr.